(12) United States Patent
Garcia et al.

(10) Patent No.: US 8,887,534 B2
(45) Date of Patent: *Nov. 18, 2014

(54) PUNCTURE RESISTANT, OPTIONALLY CUT AND ABRASION RESISTANT, KNIT GARMENT MADE WITH MODIFIED KNIT STRUCTURE

(75) Inventors: Alejandro Garcia, Downey, CA (US); Walter Schulein, Little Egg Harbor, NJ (US); Matthew Kolmes, New York, NY (US)

(73) Assignee: Nathaniel H. Kolmes, Hickory, NC (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/538,218

(22) Filed: Aug. 10, 2009

(65) Prior Publication Data
US 2010/0175430 A1 Jul. 15, 2010

Related U.S. Application Data

(63) Continuation-in-part of application No. 12/206,834, filed on Sep. 9, 2008, now abandoned.

(51) Int. Cl.
*D04B 1/24* (2006.01)
*B32B 5/26* (2006.01)

(52) U.S. Cl.
CPC ... *B32B 5/26* (2013.01); *D04B 1/24* (2013.01); *D10B 2403/023* (2013.01)
USPC .......................................................... 66/202

(58) Field of Classification Search
USPC ............... 66/169 R, 170, 171, 202, 196, 174; 442/189–191; 2/2.5, 16, 21, 22
See application file for complete search history.

(56) References Cited

U.S. PATENT DOCUMENTS

| | | | | |
|---|---|---|---|---|
| 709,734 | A | * | 9/1902 | Bellis ............................... 66/196 |
| 2,879,654 | A | * | 3/1959 | Evans ............................... 66/176 |
| 4,356,710 | A | * | 11/1982 | Mizuno et al. ................... 66/196 |
| 4,777,789 | A | | 10/1988 | Kolmes et al. |
| 4,838,017 | A | | 6/1989 | Kolmes et al. |
| 4,936,085 | A | | 6/1990 | Kolmes et al. |
| 5,177,948 | A | | 1/1993 | Kolmes et al. |
| 5,308,674 | A | | 5/1994 | Zafiroglu |
| 5,373,713 | A | * | 12/1994 | Miller ............................... 66/196 |
| 5,382,264 | A | | 1/1995 | Sharma |

(Continued)

FOREIGN PATENT DOCUMENTS

GB 214594 A1 * 9/1924 ...................... 66/196

OTHER PUBLICATIONS

U.S. Appl. No. 60/730,829, Oct. 28, 2005, Kolmes.
U.S. Appl. No. 61/020,790, Jan. 14, 2008, Kolmes, et al.

(Continued)

*Primary Examiner* — Danny Worrell
(74) *Attorney, Agent, or Firm* — Oblon, Spivak, McClelland, Maier & Neustadt, L.L.P.

(57) ABSTRACT

A knit fabric having a modified knit structure, having a front layer of knit fabric and a back layer of knit fabric, wherein the front layer and back layer are joined together by rows of tuck stitches formed from a yarn having no more than 3% elongation and wherein the knit fabric is puncture resistant, and optionally cut and/or abrasion resistant, and a protective garment made therefrom.

17 Claims, 3 Drawing Sheets

(56) References Cited

U.S. PATENT DOCUMENTS

| | | |
|---|---|---|
| 5,423,168 A | 6/1995 | Kolmes et al. |
| 5,500,025 A | 3/1996 | Sharma |
| 5,628,172 A | 5/1997 | Kolmes et al. |
| 5,632,137 A | 5/1997 | Kolmes et al. |
| 5,644,907 A | 7/1997 | Kolmes et al. |
| 5,655,358 A | 8/1997 | Kolmes |
| 5,845,476 A | 12/1998 | Kolmes |
| 6,212,914 B1 | 4/2001 | Kolmes et al. |
| 6,230,524 B1 | 5/2001 | Kolmes et al. |
| 6,341,483 B1 | 1/2002 | Kolmes et al. |
| 6,349,531 B1 | 2/2002 | Kolmes et al. |
| 6,363,703 B1 | 4/2002 | Kolmes |
| 6,367,290 B2 | 4/2002 | Kolmes et al. |
| 6,381,940 B1 | 5/2002 | Kolmes et al. |
| 6,467,251 B1 | 10/2002 | Kolmes |
| RE38,136 E | 6/2003 | Kolmes |
| 7,017,376 B2 | 3/2006 | Meckley et al. |
| 7,100,352 B2 | 9/2006 | Robins |
| 7,111,445 B2 | 9/2006 | Threlkeld et al. |
| 7,178,323 B2 | 2/2007 | Kolmes et al. |
| 7,214,425 B2 | 5/2007 | Kolmes et al. |
| 2005/0086924 A1 | 4/2005 | Kolmes |
| 2005/0186259 A1 | 8/2005 | Threlkeld et al. |
| 2006/0088712 A1 | 4/2006 | Threlkeld et al. |
| 2007/0094761 A1 | 5/2007 | Kolmes et al. |
| 2007/0099528 A1 | 5/2007 | Kolmes et al. |
| 2007/0137164 A1 | 6/2007 | Kolmes et al. |
| 2007/0144135 A1 | 6/2007 | Kolmes et al. |
| 2007/0271965 A1 | 11/2007 | Kolmes et al. |
| 2009/0019612 A1 | 1/2009 | Schulein et al. |

OTHER PUBLICATIONS

U.S. Appl. No. 12/134,446, Jun. 6, 2008, Kolmes, et al.
U.S. Appl. No. 12/206,834, Sep. 9, 2008, Schulein, et al.
U.S. Appl. No. 12/538,218, Aug. 10, 2009, Schulein, et al.
U.S. Appl. No. 14/023,977, filed Sep. 11, 2013, Kolmes, et al.

\* cited by examiner

PUNCTURE RESISTANT, OPTIONALLY CUT AND ABRASION RESISTANT, KNIT GARMENT MADE WITH MODIFIED KNIT STRUCTURE

INFORMATION ON RELATED APPLICATIONS

The present invention is related to and is a Continuation-in-Part of U.S. application Ser. No. 12/206,834, filed Sep. 9, 2008, the entire contents of which are hereby incorporated by reference.

BACKGROUND OF THE INVENTION

1. Field of the Invention

The present invention relates to a puncture, cut and abrasion resistant knit fabric having a modified knit structure, and to a garment formed from the fabric.

2. Description of the Related Art

In many activities, it is desirable to provide protective garments, including undergarments, to protect participants from being cut. Ideally, such garments should be flexible, pliable, soft and cut/abrasion resistant. Unfortunately, any improvement in the cut and/or abrasion resistance has usually been at the sacrifice of the other properties. Protective garments have been made cut resistant in the past through the use of yarns which contain wire, fiberglass and high denier high performance yarns such as aramids. However, the use of wire is problematic in environments where a protective garment must not be electrically or thermally conductive. Moreover, experience has shown that the wire may break and injure the hand of the wearer. Lastly, articles or garments having a high wire content may be difficult and/or expensive to clean using conventional cleaning techniques. Further, the use of fiberglass can create significant problems with comfort, particularly in a light weight construction undergarment, as the glass fibers tend to cause significant skin irritation. Anyone that has worked with installing fiberglass batting as insulation can attest to this. The use of high denier high performance yarns such as aramids is problematic in causing the yarn and resultant garment to be too bulky for use, particularly in sporting applications.

In response to these problems, non-metallic cut-resistant yarns have been developed. These yarns have been described in U.S. Pat. Nos. 5,177,948 and 5,845,476 to Kolmes et al. which are owned by the assignee of the present invention. The contents of these patents are incorporated herein by reference. Kolmes '948 describes a yarn having substantially parallel core strands which may include fiberglass. Kolmes '476 describes other non-metal containing yarn constructions which contain fiberglass as a core yarn. However, these yarns are typically too bulky in denier to be used in undergarments, hosiery or other intimate apparel.

In addition, if puncture resistance is needed, multiple layers of woven fabric are typically required, particularly made from high strength performance yarns, such as aramid. Often, in knit fabrics, puncture resistance has been extremely difficult, if not impossible, to achieve due to knit stitches often being able to have mobility thus "robbing" yarn from adjacent stitches to open a hole in the fabric, without cutting or tearing the yarns.

Common metal mesh products are marketed to provide cut, slash and laceration protection, but often are insufficient in puncture resistance, due to the holes in the mesh.

Accordingly, a modified knit structure fabric is needed that can provide puncture, cut and abrasion resistance.

SUMMARY OF THE INVENTION

One object of the present invention is to provide a modified knit structure fabric that can provide puncture, cut and abrasion resistance.

A further object of the present invention is to provide a garment formed from the modified knit structure fabric that provides puncture, cut and abrasion resistance to the wearer, particularly in the form of an apron useable in industrial situations needing such protection.

These and other objects of the present invention, either individually or in combinations thereof, have been satisfied by the discovery of a knit fabric having a modified knit structure, comprising:
  a front layer of knit fabric and a back layer of knit fabric, wherein the front layer and back layer are joined together by rows of tuck stitches formed from a yarn having no more than 4.5% elongation;
  wherein the knit fabric is puncture resistant,
  and a protective garment made from the knit fabric, optionally having cut and/or abrasion resistance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
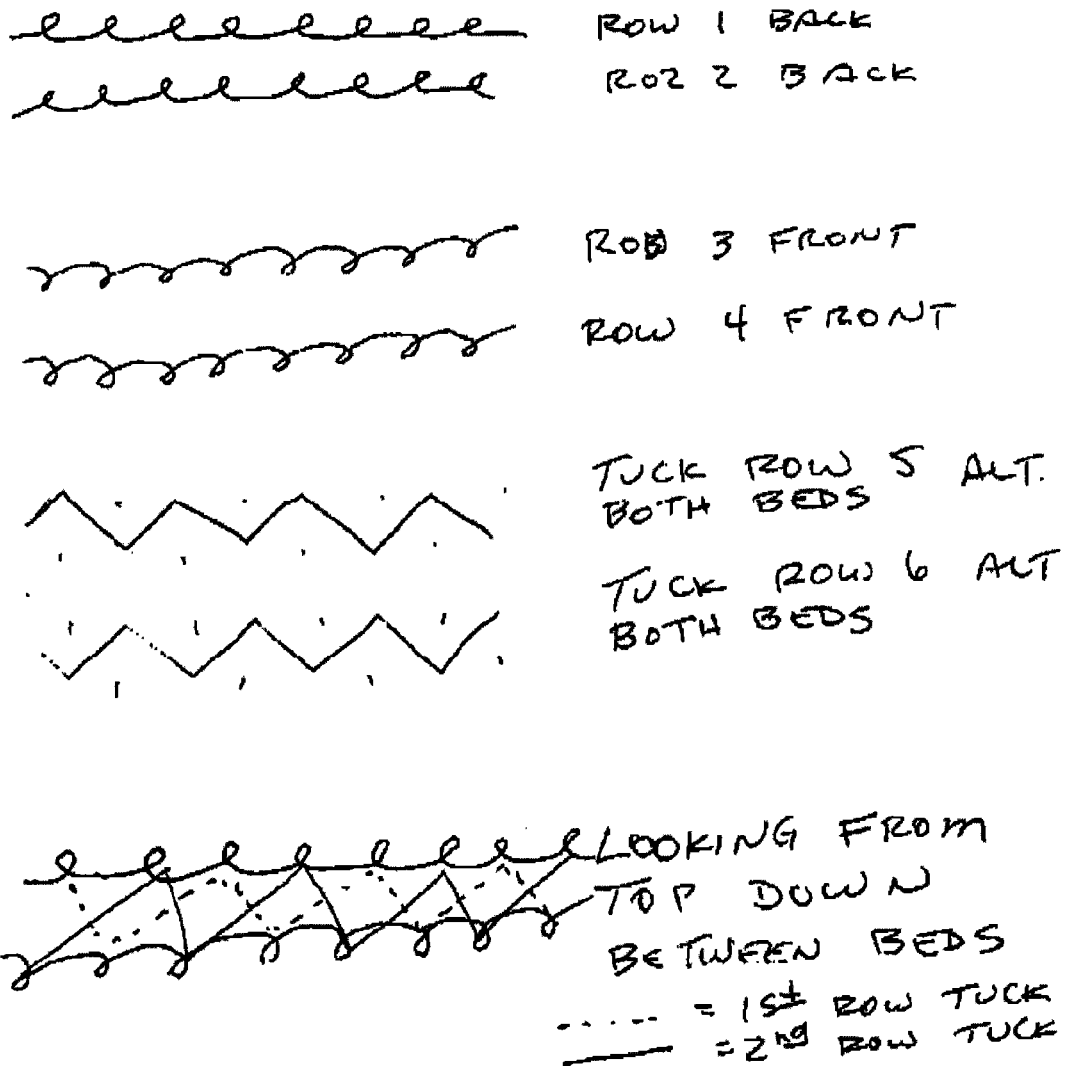
FIG. 1 shows an exemplary embodiment of modified knit stitch to prepare the knit fabric of the present invention.

The term "fiber" as used herein refers to a fundamental component used in the assembly of yarns and fabrics. Generally, a fiber is a component which has a length dimension which is much greater than its diameter or width. This term includes ribbon, strip, staple, and other forms of chopped, cut or discontinuous fiber and the like having a regular or irregular cross section. "Fiber" also includes a plurality of any one of the above or a combination of the above.

As used herein, the term "high performance fiber" means that class of synthetic or natural non-glass fibers having high values of tenacity greater than 10 g/denier, such that they lend themselves for applications where high abrasion and/or cut resistance is important. Typically, high performance fibers have a very high degree of molecular orientation and crystallinity in the final fiber structure.

The term "filament" as used herein refers to a fiber of indefinite or extreme length such as found naturally in silk. This term also refers to manufactured fibers produced by, among other things, extrusion processes. Individual filaments making up a fiber may have any one of a variety of cross sections to include round, serrated or crenular, bean-shaped or others.

The term "intimate blend" as used herein refers to a mixture of fibers of at least two types, wherein the mixture is formed in such a way that the individual filaments of each type of fiber are substantially completely intermixed with individual filaments of the other types to provide a substantially homogeneous mixture of fibers, having sufficient entanglement to maintain its integrity in further processing and use.

The term "stretch broken" as used herein refers to a process in which fibers are hot stretched and broken to produce short fiber lengths, rather than cutting, in order to prevent some of the damage done by the cutting process.

The term "yarn" as used herein refers to a continuous strand of textile fibers, filaments or material in a form suitable for knitting, weaving, or otherwise intertwining to form a textile fabric. Yarn can occur in a variety of forms to include a spun yarn consisting of staple fibers usually bound together by twist; a multi filament yarn consisting of many continuous filaments or strands; or a mono filament yarn which consists of a single strand. A "blended yarn" as used herein refers to a yarn that comprises an intimate blend of at least two different types of fibers.

The term "end" as used herein refers to a single yarn ply used in preparation of multi-end yarns. The two or more ends may be put together by twisting together, wrapping a cover wrap around the combined ends or by air-interlacing as described below.

The term "composite yarn" refers to a yarn prepared from two or more yarns, which can be the same or different. Composite yarn can occur in a variety of forms wherein the two or more yarns are in differing orientations relative to one another. The two or more yarns can, for example, be parallel, wrapped one around the other(s), twisted together, or combinations of any or all of these, as well as other orientations, depending on the properties of the composite yarn desired. Examples of such composite yarns are provided in U.S. Pat. No. 4,777,789, U.S. Pat. No. 4,838,017, U.S. Pat. No. 4,936,085, U.S. Pat. No. 5,177,948, U.S. Pat. No. 5,628,172, U.S. Pat. No. 5,632,137, U.S. Pat. No. 5,644,907, U.S. Pat. No. 5,655,358, U.S. Pat. No. 5,845,476, U.S. Pat. No. 6,212,914, U.S. Pat. No. 6,230,524, U.S. Pat. No. 6,341,483, U.S. Pat. No. 6,349,531, U.S. Pat. No. 6,363,703, U.S. Pat. No. 6,367,290, and U.S. Pat. No. 6,381,940 (collectively, the "Kolmes patents"), the contents of each of which are hereby incorporated by reference.

The term "air interlacing" as used herein refers to subjecting multiple strands of yarn to an air jet to combine the strands and thus form a single, intermittently commingled strand. This treatment is sometimes referred to as "air tacking." This term is not used to refer to the process of "intermingling" or "entangling" which is understood in the art to refer to a method of air compacting a multifilament yarn to facilitate its further processing, particularly in weaving processes. A yarn strand that has been intermingled typically is not combined with another yarn. Rather, the individual multifilament strands are entangled with each other within the confines of the single strand. This air compacting is used as a substitute for yarn sizing and as a means to provide improved pick resistance. This term also does not refer to well known air texturizing performed to increase the bulk of single yarn or multiple yarn strands. Methods of air interlacing in composite yarns and suitable apparatus therefore are described in U.S. Pat. Nos. 6,349,531; 6,341,483; and 6,212,914, the relevant portions of which are hereby incorporated by reference.

The term "composite fabric" is used herein to indicate a fabric prepared from two or more different types of yarn or composite yarn. The fabric construction can be any type, including but not limited to, woven, knitted, non-woven, etc. The two or more different types of yarn or composite yarn include, but are not limited to, those made from natural fibers, synthetic fibers and combinations thereof.

The term "composite article" is used herein to indicate a final article that comprises at least two different types of materials. The composite article can be prepared from a composite fabric, or can be prepared from a conventional fabric containing only one type of yarn, but is put together using a yarn or sewing thread made of a different material. Alternatively, the conventional fabric can be sewn together using a composite yarn as the sewing thread. Composite articles can be any form, including but not limited to, gloves, aprons, socks, filters, shirts, pants, undergarments, one-piece jumpsuits, etc. All of these types of articles, as well as other permutations that are readily evident to those of skill in the art, are included in the present invention definition of "composite article".

For convenience, the term "yarn component" as used herein, encompasses fiber, monofilament, multifilament and yarn.

The present invention modified knit structure fabric is formed on a conventional two bed knitting machine, such as a flat bed knitting machine. The fabric has two layers of fully formed and separate knit fabric on the front and back beds. The type of knit fabric is not particularly important, although knit jersey is preferred due to simplicity. Two rows of the front and back panels of knit un-connected fabric are then attached by (2) rows of tuck stitches. The tuck stitches can be done on every needle, or on alternating needles in opposite directions. Preferably, the 2 rows of jersey on the back and 2 rows of jersey on the front are held together by tucks on needles 1,3,5,7 . . . etc. on a first row of each, followed by tucks on needles 2,4,6,8, . . . etc. on the second row of each—so all needles have been tucked on—then the cycle repeats. It is even possible to use 3 rows of every third needle, or 4 rows of every fourth needle, although these embodiments would tend to sacrifice puncture resistance relative to the alternating tuck stitch or every needle tuck stitch embodiments.

The tuck stitches can be made using any desired yarn, so long as the yarn has elongation that is low enough to prevent borrowing or "robbing" of yarn from adjacent stitches, permitting a hole to open up. Preferably, the tuck stitches have an elongation that is no more than 4.5%, more preferably no more than 4%, still more preferably no more than 3.75%, even more preferably no more than 3% elongation, further preferably no more than 2.5% elongation, still more preferably no more than 2% elongation, even more preferably no more than 1.5% elongation, still more preferably no more than 1% elongation, and most preferably no more than 0.5% elongation. In a most preferred embodiment, the tuck stitches are formed using a composite yarn that has essentially no elongation, to avoid the ability of stitches to "rob" yarn from one another, thus permitting a hole to open up. With little or no elongation, the tuck stitches hold the knit fabric tightly together, providing the desired puncture resistance. The tuck stitch yarn can be the same or different from that used in the knit jersey front and back panels. Preferably, to obtain puncture, cut and abrasion resistance, the knit jersey and the tuck stitches are formed from at least one type of cut and abrasion resistant yarn, most preferably from a composite yarn that is cut and abrasion resistant.

FIG. 1 provides an exemplary preferred stitch pattern for use in the present invention showing (from top to bottom) two rows of knit jersey stitch in back, and two rows of knit jersey stitch in front, followed by two rows of alternating tuck stitches. The final portion of the figure shows the stitches looking from top down between the two beds, giving an indication of the interrelation between the jersey stitches and the tuck stitches.

Because these tucks are not formed knit stitches, there is no extra yarn to "rob" to expand a natural hole in this fabric from an awl, nail, or other pointy device that could normally penetrate knit fabric. This does not include cutting or breaking the yarn to make a hole.

The resulting puncture resistant fabric can be made from any desired yarn, but is preferably made from high performance yarns, composite yarns, fiberglass, and other cut and abrasion resistant materials, in order to provide a knit fabric having not only cut and abrasion resistance, but also puncture resistance. Another advantage provided by the present invention modified knit structure is the ability to use high performance yarns or composite yarns having cut and abrasion resistance on a conventional knitting machine. In many cases, such high performance or composite yarns are not readily useable on flat bed knitting machines. With the present invention modified knit structure, this is not a problem.

Figure 2:
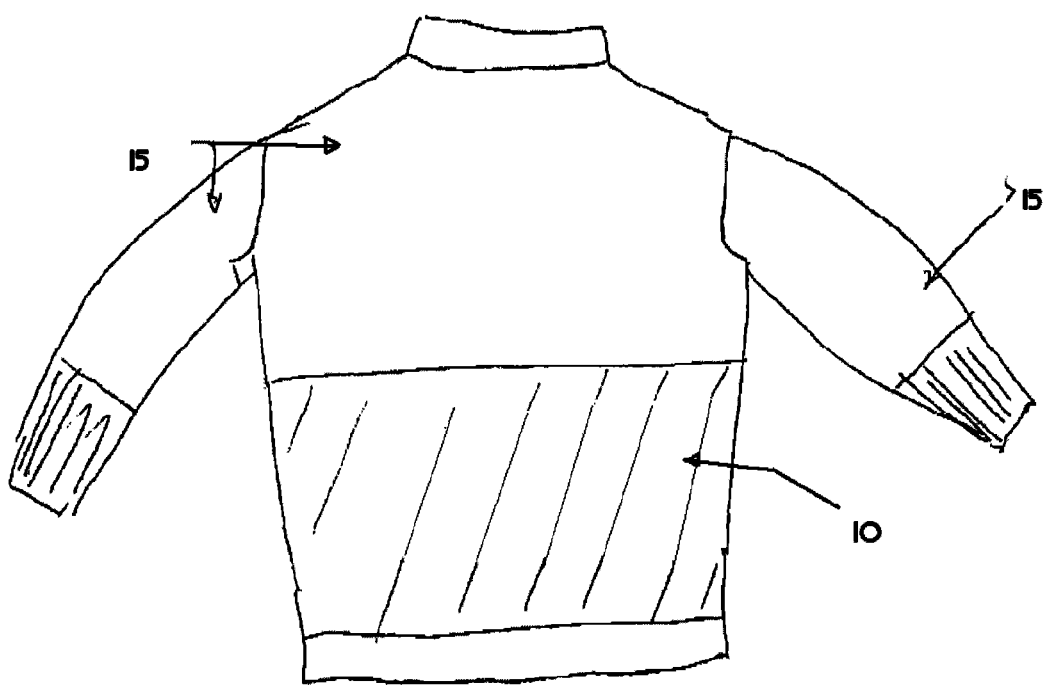
FIG. 2 shows a preferred embodiment of sweater/jacket having a panel made of the present invention puncture resistant knit fabric.

The fabric of the present invention can be made into a variety of protective garments, such as aprons, gloves, shirts, pants, jumpsuits, arm coverings, etc. Additionally, the fabric of the present invention can form any part of or the entire garment, depending on the end use. For example, a protective glove can be made in accordance with any of the above noted patents regarding composite yarns, wherein the palm is made of the present invention modified knit structure. In a preferred embodiment (see FIG. 2), the fabric is formed into a protective panel 10 in a sweater/jacket that is an integral combination where the top portion 15 can be any fabric or covering, such as leather, or a sweater/shirt having shaped knit sleeves in accordance with U.S. patent application Ser. No. 11/778, 340, filed Jul. 16, 2007 (hereby incorporated by reference), most preferably with thumb loops (not shown) present at the cuffs for maintaining the sleeves protection on the full length of the arm without riding up the arm of the wearer. The back is preferably open from 2" below the arm holes where it ends in a cuff. FIG. 2 shows a preferred version of the sweater/jacket having the puncture resistant protective panel 10 in the front protecting the wearer from approximately the rib cage down to the waist. The sweater/jacket can also be extended in length providing additional protection down to knee or floor level if desired, by extending the front puncture resistant panel, while stopping the back at waist level.

Figure 3:
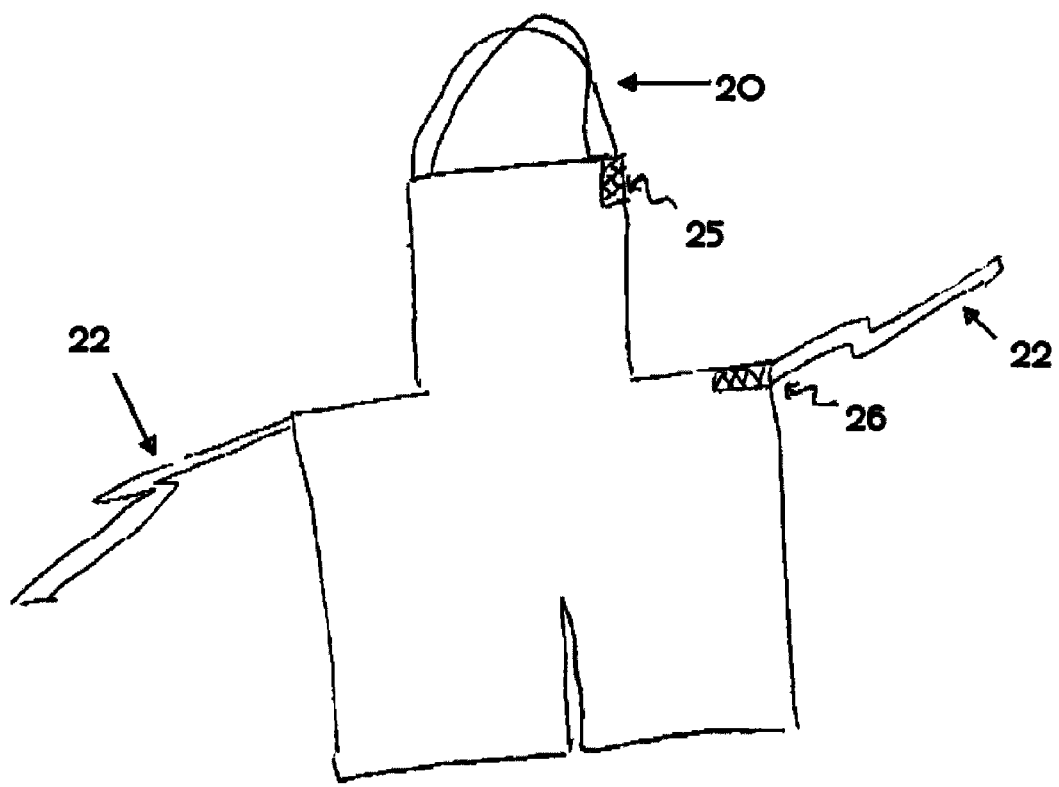
FIG. 3 shows a preferred embodiment apron formed from the present invention puncture resistant knit fabric.

In another embodiment, the present invention modified knit structure fabric is formed into an apron as shown in FIG. 3. In this preferred embodiment, the entire apron is made of the present invention modified knit structure fabric (except for the neck sash 20 and the waist ties 22). Though any closure system can be used to keep the apron in place (such as ties, etc), there is most preferably a simple adjustable nylon web with hook-and-loop closure system to keep the apron in place. The closures 25 and 26, for the neck sash 20 and waist ties 22, respectively, are preferably made of a hook-and-loop closure system (such as VELCRO). This permits the wearer to secure the apron into place, but permits the apron to break loose should it get caught in machinery.

The front of the apron is made of the modified knit structure fabric of the present invention from 2" below the arm holes and extends to the full length of the front of the apron.

In a most preferred embodiment, the apron length extends to just below the knees of the wearer.

Obviously, numerous modifications and variations of the present invention are possible in light of the above teachings. It is therefore to be understood that within the scope of the appended claims, the invention may be practiced otherwise than as specifically described herein.

The invention claimed is:

1. A knit fabric having a modified knit structure, comprising:
a front layer of knit fabric and a back layer of knit fabric, wherein the front layer and back layer are joined together by rows of tuck stitches formed from a yarn having no more than 4.5% elongation, to avoid borrowing of yarn from adjacent areas and thus avoid having a hole open up, wherein the rows of tuck stitches are rows of alternating tuck stitches;
wherein the knit fabric is puncture resistant.

2. The knit fabric of claim 1, wherein the front layer and back layer are each a knit jersey layer.

3. The knit fabric of claim 1, wherein the rows of tuck stitches are rows of alternating tuck stitches.

4. The knit fabric of claim 1, wherein one or both of the front layer and back layer comprise one or more composite yarns.

5. The knit fabric of claim 1, wherein the knit fabric is cut and abrasion resistant.

6. The knit fabric of claim 1, wherein the tuck stitches are formed from a yarn having no more than 4% elongation.

7. The knit fabric of claim 6, wherein the tuck stitches are formed from a yarn having no more than 3.75% elongation.

8. A protective garment made from the knit fabric of claim 1.

9. A protective garment made from the knit fabric of claim 5.

10. The protective garment of claim 8, wherein the protective garment is a member selected from the group consisting of aprons, gloves, shirts, pants, jumpsuits, and arm coverings.

11. The protective garment of claim 9, wherein the protective garment is a member selected from the group consisting of aprons, gloves, shirts, pants, jumpsuits, and arm coverings.

12. The protective garment of claim 10, wherein the protective garment is an apron.

13. The protective garment of claim 12, wherein the apron is formed entirely from the knit fabric having a modified knit structure, except for the closure system used to keep the apron in place on the wearer.

14. The protective garment of claim 11, wherein the protective garment is an apron.

15. The protective garment of claim 14, wherein the apron is formed entirely from the knit fabric having a modified knit structure, except for the closure system used to keep the apron in place on the wearer.

16. The knit fabric of claim 1, wherein the yarn forming the tuck stitches is different from yarns used in each of the front and back layers of knit fabric.

17. A protective garment made from the knit fabric of claim 16.

* * * * *